US009438908B1

(12) United States Patent
Sheng et al.

(10) Patent No.: US 9,438,908 B1
(45) Date of Patent: Sep. 6, 2016

(54) MOTION VECTOR INTERPOLATION BASED ON TRUE MOTION AND LAYER INFORMATION

(71) Applicant: PIXELWORKS, INC., Portland, OR (US)

(72) Inventors: Xiaojie Sheng, Shanghai (CN); Neil Woodall, Newport Beach, CA (US); Bob Zhang, Santa Clara, CA (US); Guohua Cheng, Shanghai (CN); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 381 days.

(21) Appl. No.: 14/189,076

(22) Filed: Feb. 25, 2014

(51) Int. Cl.
*H04N 19/51* (2014.01)

(52) U.S. Cl.
CPC .............................. *H04N 19/00696* (2013.01)

(58) Field of Classification Search
CPC ........................ H04N 7/0137; H04N 7/0127
See application file for complete search history.

(56) References Cited

U.S. PATENT DOCUMENTS

| 8,934,055 B1* | 1/2015 | Sheng | H04N 7/0137 348/452 |
| 9,258,519 B2* | 2/2016 | Shi | H04N 7/0137 |
| 2015/0103897 A1* | 4/2015 | Kim | H04N 19/573 375/240.12 |

* cited by examiner

*Primary Examiner* — Dave Czekaj
*Assistant Examiner* — Nam Pham
(74) *Attorney, Agent, or Firm* — Marger Johnson

(57) ABSTRACT

A method to produce a frame of video data includes receiving original frame true motion information, original frame object boundary information, and original frame layer information for at least two original frames of video data, and generating interpolation phase block-level motion and interpolation phase pixel-level layer information from the original frame block-level true motion information, original frame pixel-level object boundary information, and original frame pixel-level layer information for the original frame.

12 Claims, 10 Drawing Sheets

MOTION VECTOR INTERPOLATION BASED ON TRUE MOTION AND LAYER INFORMATION

BACKGROUND

Moving video sources from lower frame rates to higher frame rates requires the generation of new frames of video data between the current, already existing frames. The new frames typically result from an interpolation process in which the pixels of the new frames are computed from a current frame, CF, and a previous frame, P1. More than one frame may be interpolated between the two frames. The interpolation process is a scaling operation in the temporal domain, therefore the location for the interpolated frames refer to as phases rather than frames.

The interpolation process must account for movement of objects in the video data between frames. An object in motion will have pixels that depict that object in different locations in the current frame than the locations of those pixels in the previous frame. Motion estimation and motion compensation techniques use estimated motion to estimate the resulting position of those pixels in the current frame.

Using true motion information improves the resulting image quality because the motion information used is the actual motion information, not estimated motion information. Even using true motion, problems may still arise. For example, even state-of-the-art automatic motion vector calculation cannot generate the true motion fields at the interpolation phase perfectly. This results in annoying artifacts at the interpolation phase. In another example, current frame interpolation methods have difficulties in perfecting object cover/uncover analysis. Other methods are needed that generate high quality frame interpolation results.

DETAILED DESCRIPTION OF THE EMBODIMENTS

Figure 1:
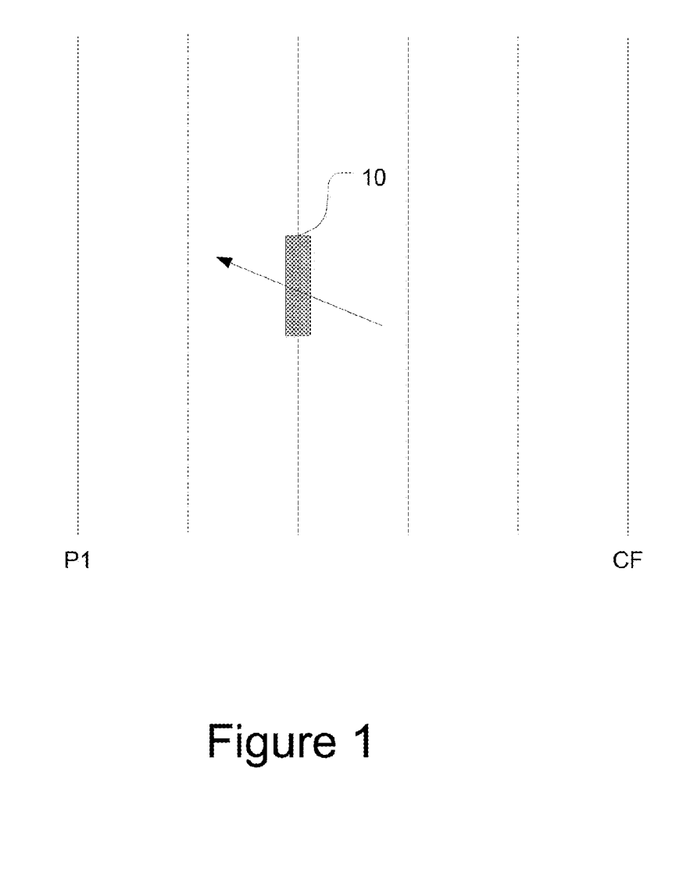
FIG. 1 shows an example of a block in an interpolation phase.

True motion based frame interpolation needs the true motion fields at the interpolation phase to do frame interpolation. As illustrated in FIG. 1, for a block 10 in the interpolation phase, the process begins with its true motion at the original frame P1 and CF frame. This allows for conversion from the low frame rate video into any high frame rate. The true motion information may be acquired in any way. For example, the information may be acquired through a system such as that disclosed in U.S. patent application Ser. No. 14/146,968 "A Novel Tool for True Motion Vector Editing." This patent application describes a true motion editing tool which enables the user to edit the motion fields of the original frames P1 and CF, and get both the block level true motion, pixel level object boundary information and pixel level layer information. However, no matter in what manner this information is acquired, the process described herein employs the true motion information to determine the true motion at the interpolation phase and then uses that information to interpolate a frame between the current frame and a previous frame.

Figure 2:
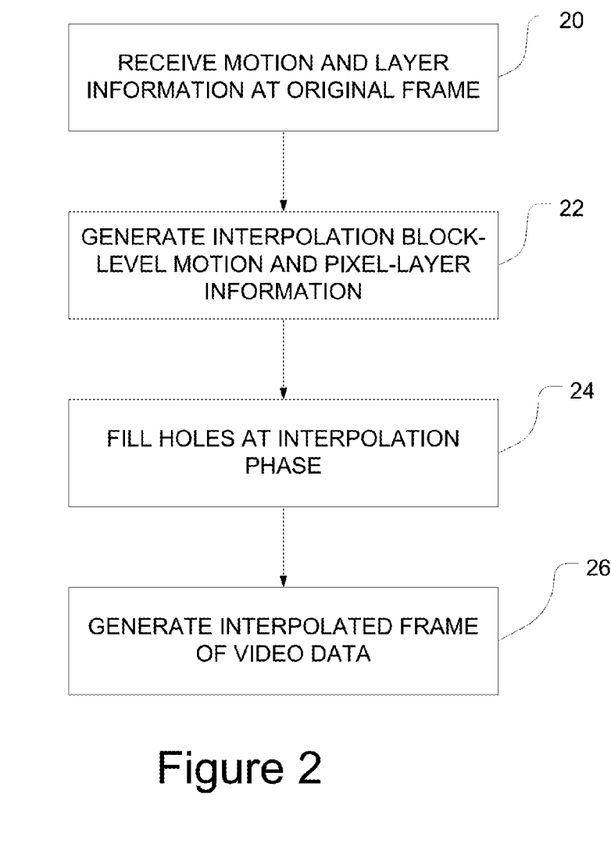
FIG. 2 shows a flowchart of an embodiment of a method of frame interpolation based upon true motion and layer information.

FIG. 2 shows an embodiment of a flowchart of a method to use block level and pixel-level layer information at the original frames to generate motion and layer information at an interpolated phase. The block level motion and pixel level layer information is received at 20. The process then generates the interpolation block-level motion and pixel-level layer information at 22. Because of regions in which objects are covered and uncovered because of the motion of other objects, holes may exist in the information for the interpolation phase. These holes undergo further processing to fill in the missing information at 24. At 26, the process generates the interpolated frame of video data relying upon the true motion information generated for the interpolated phase.

Figure 3:
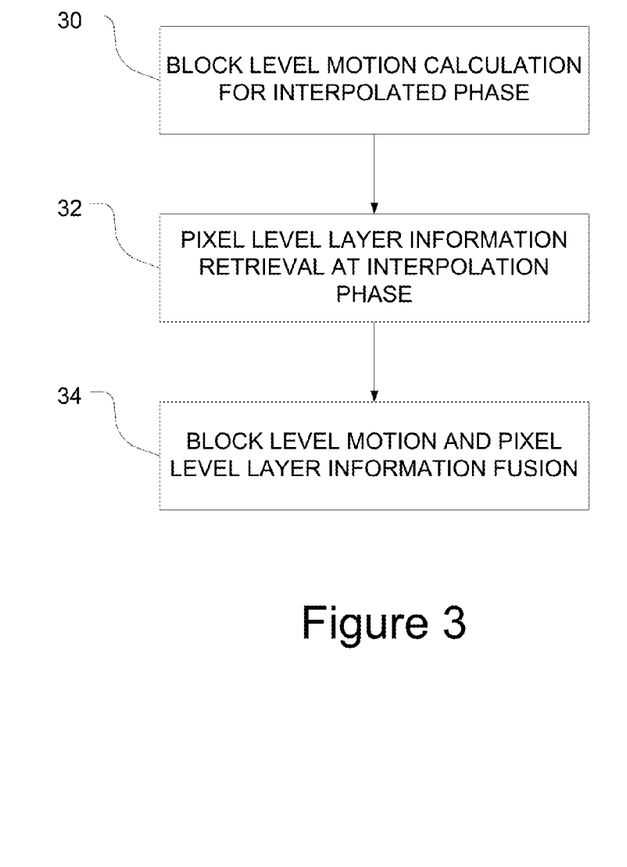
FIG. 3 shows a more detailed view of a method of block level motion and pixel level layer information at the interpolation phase.

FIG. 3 shows a more detailed view of the block 20 from FIG. 2. Using the information from at least one of the previous frame and the current frame, referred to as original frames, the process calculates the block-level motion at the interpolation phase. Because there are two original frames P1 and CF, the block-level motion at the interpolation phase is generated for each motion layer in each of the original frames P1 and CF. This will be discussed in more detail with regard to FIG. 4. At 32 the motion layer information from P1 and CF is used to retrieve the pixel-level motion layer information at the interpolation phase. The information from 30 and 32 are then fused all the above block motion and layer information into one frame at 34.

Figure 4:
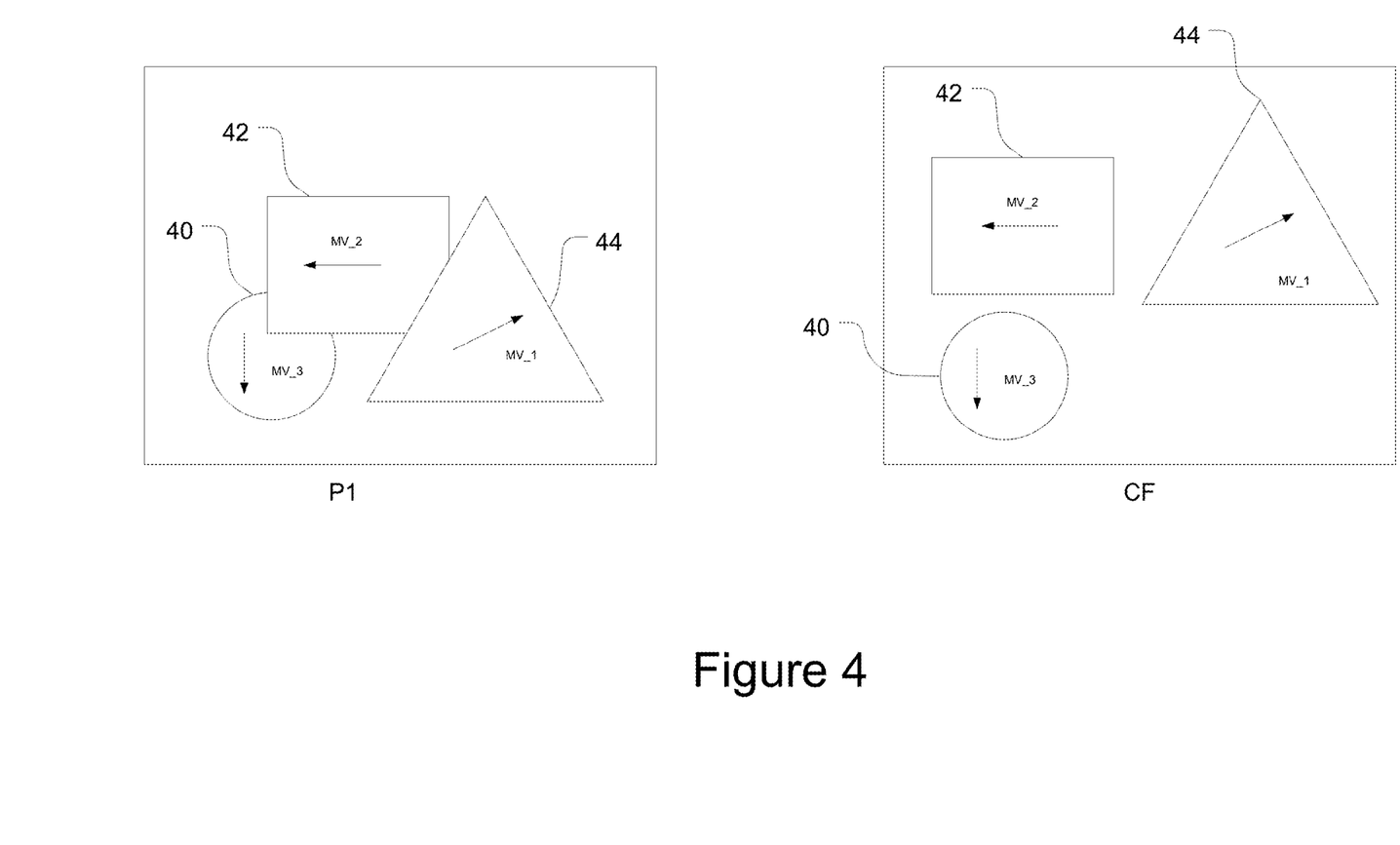
FIG. 4 shows examples of objects in motion between a previous frame and a current frame.

As mentioned previously, the process interpolates the block motion for all the layers separately from P1 and CF at the interpolation phase. For example, FIG. 4 illustrates the P1 and CF frame in which there are three moving objects, 40, 42 and 44. Each of these objects is assigned a different motion layer because in P1, they are 'stacked' from the perspective of the viewer, with object 44 in front of object 42, which is in turn in front of object 40. Each of these objects has its own set of motion vectors, and each move in a different manner. The resulting position of these objects in the current frame is shown at CF.

In addition FIG. 4 shows the boundary of the objects as it moved from P1 to CF. The motion of these boundaries has already been calculated and provided as discussed with regard to FIG. 2. Also, besides the motion of boundary in FIG. 4, the information previously provided includes the pixel-level layer information.

Figure 5:
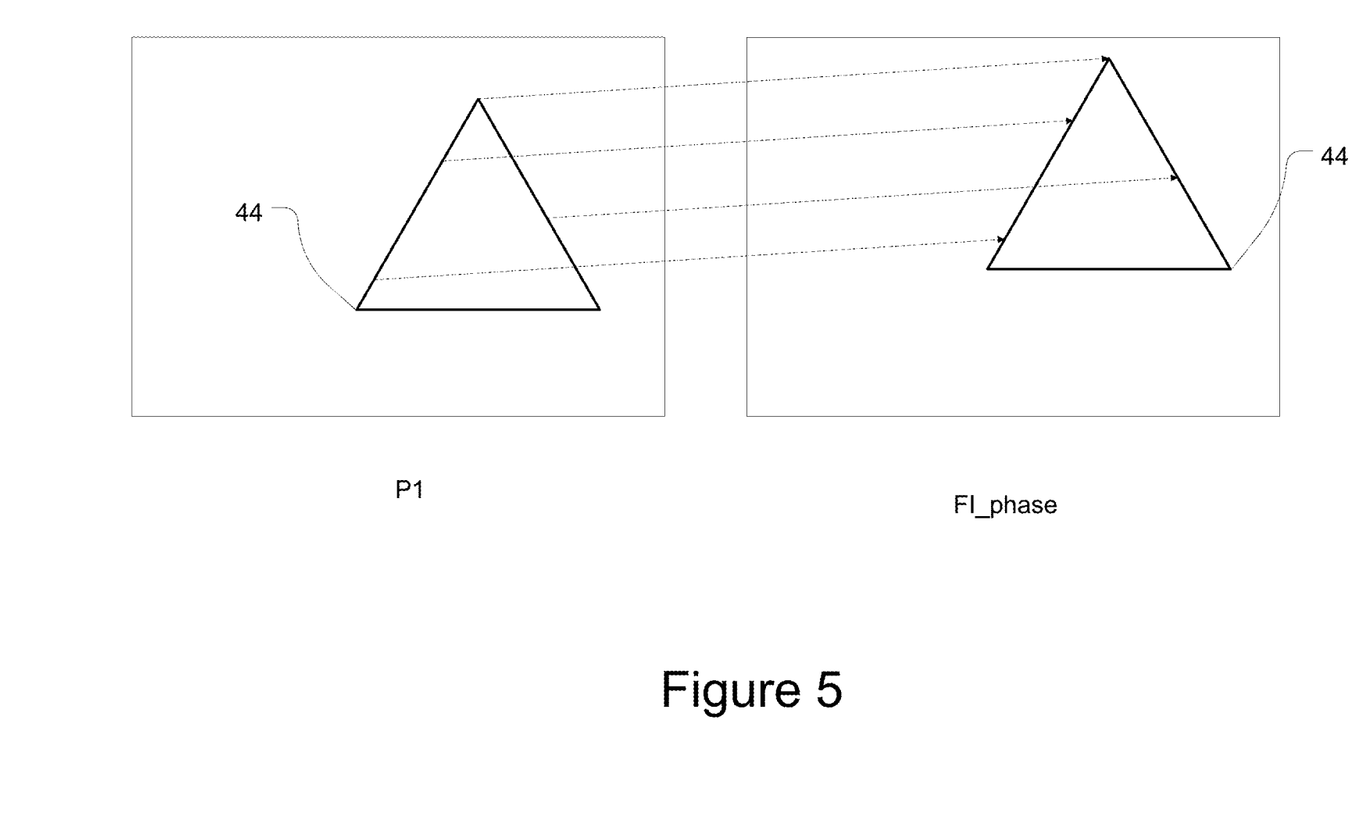
FIG. 5 shows an object in a first layer projected from a previous frame to an interpolation phase.

With the boundary pixel motion and pixel level layer information, the process generates the block level motion. In FIG. 5, the process takes the first layer object from P1 as an example. In FIG. 5 the process first projects the boundary of the first layer object to the intermediate interpolation phase by its boundary motion. During the projection, besides the boundary pixel information, the boundary pixel motion information is also projected and stored.

Once the process acquires boundary information and boundary pixel information at interpolation phase, it will generate the block level boundary information and block level motion information. As in FIG. 6 (a), the process first defines the block size as N*N, then defines all the blocks which include at least one boundary pixel as boundary blocks as illustrated as blocks in FIG. 6 (a). At the same time, it can also calculate the block level motion based on the pixel boundary motion included in the boundary blocks. One method of calculating the block level motion is to simply calculate the average motion of all included boundary pixels in the block as its block motion.

Figure 6:
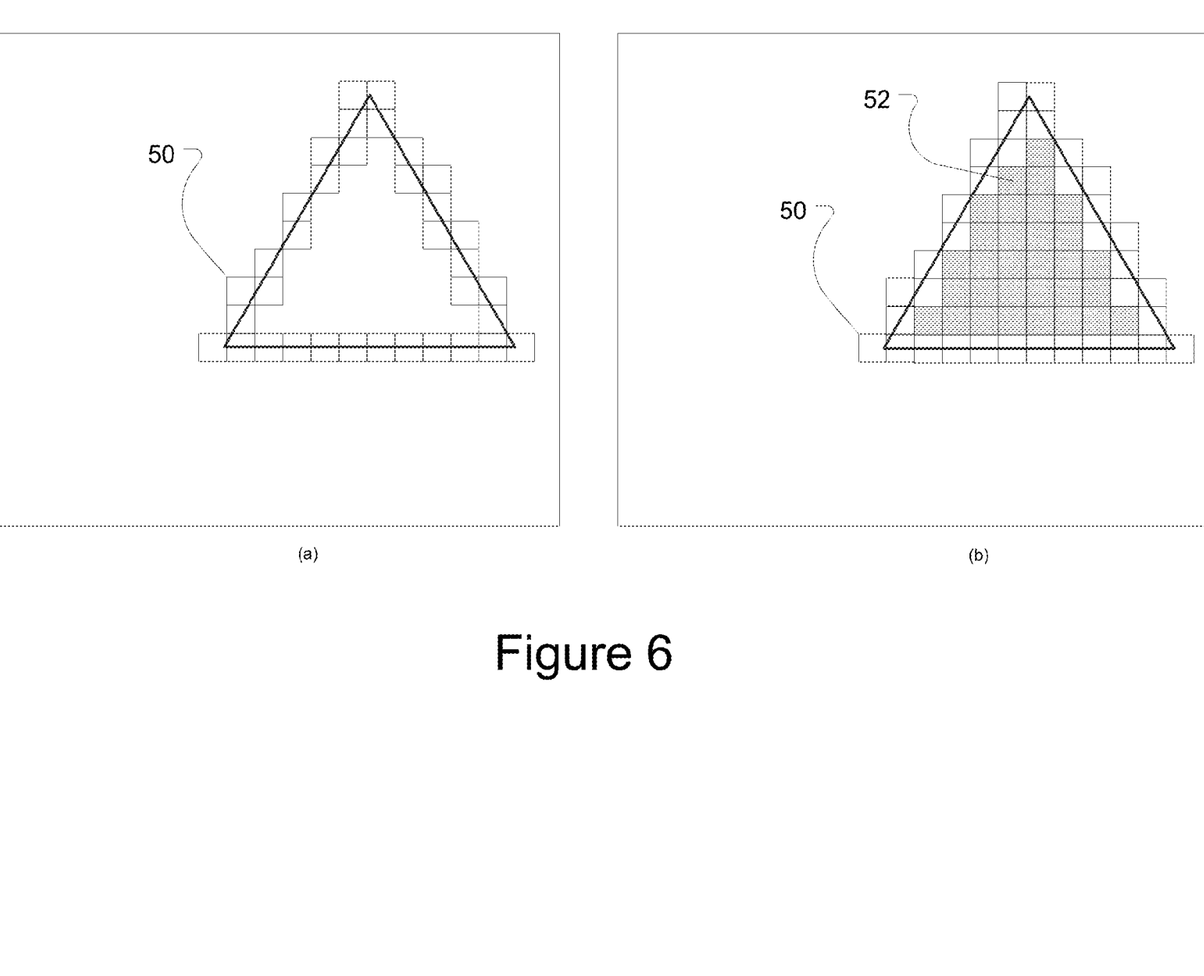
FIG. 6 shows examples of an object with boundary blocks and internal blocks.
Figure 7:
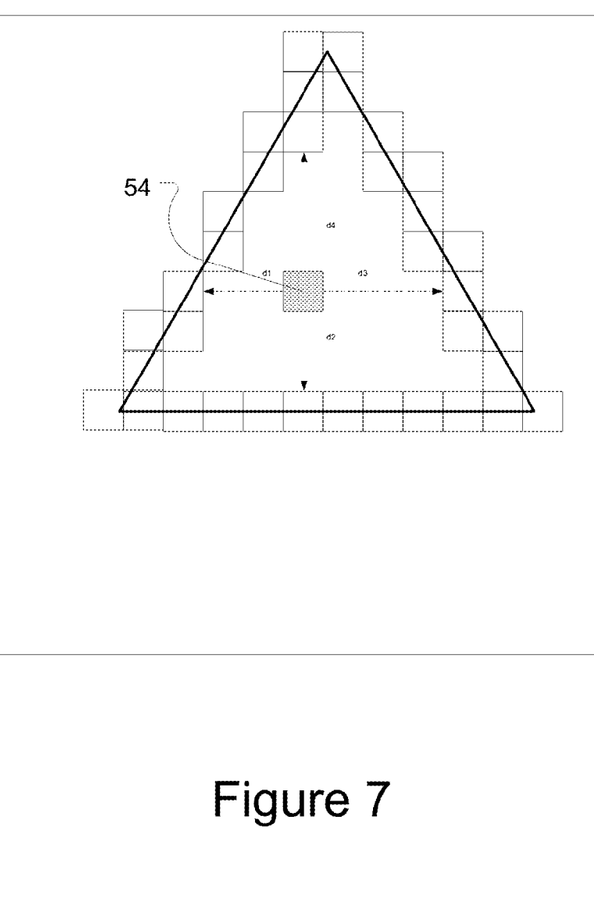
FIG. 7 shows an embodiment of an internal block inside an object.

After dealing with the boundary block layer information and boundary motion information, the process finds all the internal blocks of the block boundary. As shown in FIG. 6 (b), the gray blocks are internal blocks. To find these internal blocks, one can use the similar recursive strategy introduced in the pending application referenced above, "A Novel Tool for True Motion Vector Editing." In the embodiments here, though, the recursive strategy is carried out in at the block level. For each internal block, the process will interpolate its motion by the boundary motion as shown in FIG. 7.

To calculate the motion of an internal block, one embodiment of the process searches in four directions until it reaches a boundary block. The distances between the internal block and the boundary block in four directions are d1, d2, d3, d4 and the corresponding motions of the four boundary block are mv1, mv2, mv3, and mv4. In one embodiment the motion of the internal block can be interpolated by the above information as follows:

$$mv.x=(mv1.x*(1/d1)+mv2.x*(1/d2)+mv3.x*(1/d3)+mv4.x*(1/d4))/\text{weight}$$

$$mv.y=(mv1.y*(1/d1)+mv2.y*(1/d2)+mv3.y*(1/d3)+mv4.y*(1/d4))/\text{weight}$$

$$\text{weight}=1/d1+1/d2+1/d3+1/d4$$

The above formula demonstrates interpolation of the internal block by the boundary blocks. The weight of the boundary block motion is inversely proportion to the distance between the internal block and the boundary block. When all the motion of internal the blocks has been interpolated, a layer-based M*N filter may be used to smooth the motion. The filter used will typically have a larger dimension in the horizontal direction to allow for optimization of cost versus performance. In one embodiment, the layer-based filter finds all the M*N neighbors that have the same layer information of the current block and calculates the average motion as the filtered results for the current block. Because the block motion in the same layer should have the same motion model, the average filter will reduce any errors caused by inaccurate boundaries.

After the above process has been done, the process finishes the calculation based on P1 information for the first layer. This will be done the same way as for the CF information. Finally the process fuses the two to generate the final result for the first layer. In one embodiment, the fusion occurs in the following way. If a block in the interpolation phase both has its calculated motion from P1 and CF information, the process simply calculates the average motion as the block motion. However, if the block only has its calculated motion from P1 information, it uses that motion as the block motion. Further, if the block only has its calculated motion from CF information, the process also only uses that motion as the block motion. The other layers undergo the same processing, and after all layers have been processed, the block motion information is acquired at interpolation phase.

Figure 8:
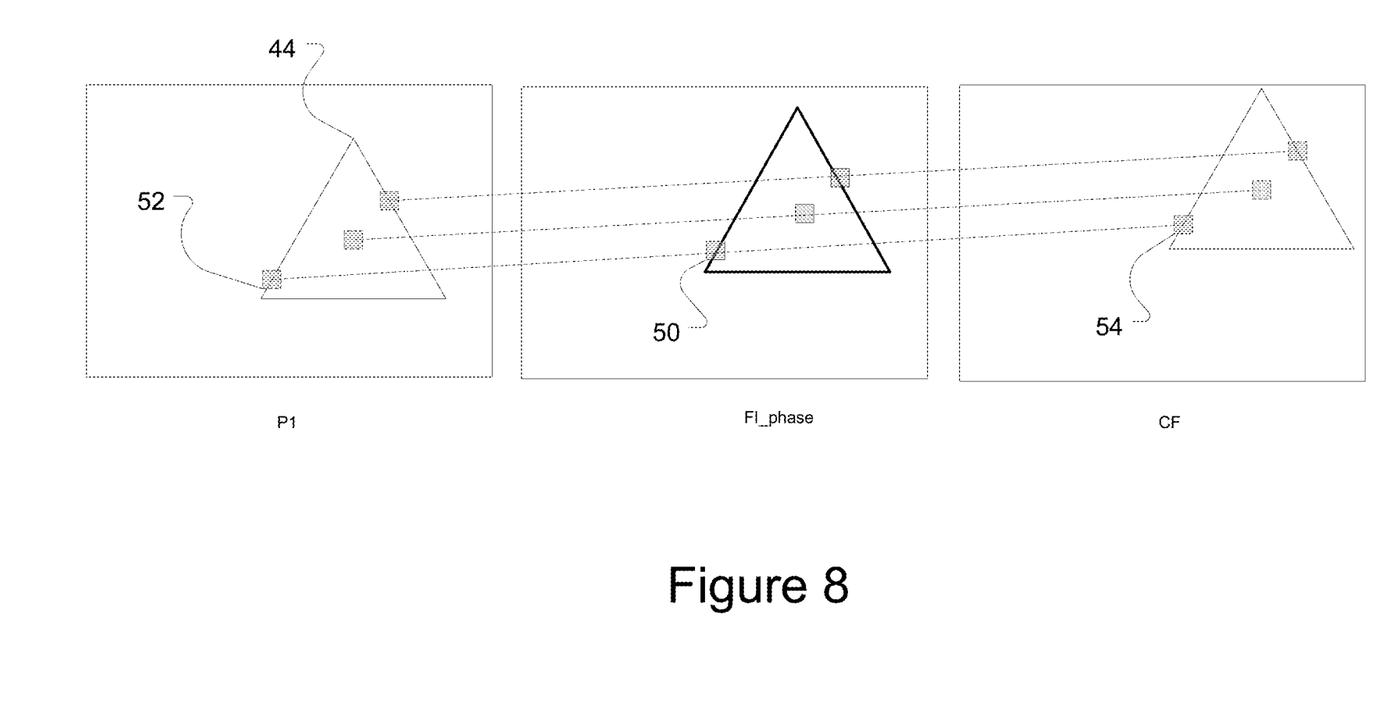
FIG. 8 shows an embodiment of pixels projected to an interpolation phase.

After the block motion information for each layer is acquired at 30, at 32 the process uses these block motions to retrieve the pixel layer information from P1 and CF. In one embodiment, this process is done as follows. For each layer in the interpolation phase, the process uses the calculated block motion for that layer to retrieve the corresponding layer information from P1 and CF separately. As shown in FIG. 8, for the first layer the process uses the block motion calculated in 32 to retrieve pixel layer information from P1 and CF. For example, the discussion considers the first layer. For a pixel such as 50 in FI, it uses the motion of its block to project to P1 at 52 and CF at 54 separately. If either of the two projected pixels in P1 or CF has the first layer information, the process assigns the first layer information for the pixel in FI.

While a sequential process is described in the above embodiment for simplicity, it should be obvious to one skilled in the art that most of the calculations can be done in parallel. That searching for object boundaries can be replaced with an algorithm where the location and motion vectors of the boundary blocks is stored for each row and column and that information used to determine how to interpolate the motion vector for an interior block.

It should be noted that if one directly projects the pixel layer information from P1 and CF to FI phase, there will be holes inside the object for the layer information in FI phase because the motion model is not constrained to translational motion only. But embodiments here instead generates the block motion for FI phase and then retrieves the pixel layer information from P1 and CF using this block motion. While technically, some types of motion could generate holes using this method, the type of motion required would require an object to go from a point source to full screen in only a couple frames. This motion is too fast for the eye to track so frame rate up conversion is typically not required After the process for the first layer, the process continues with the other layers in the same way and after all layers have been processed, one will have pixel layer information at interpolation phase for each layer. Up to this point in the discussion, at 30 and 32 in FIG. 3, the process has introduced the method for generating the block level motion and pixel layer information in FI phase for each layer.

Figure 9:
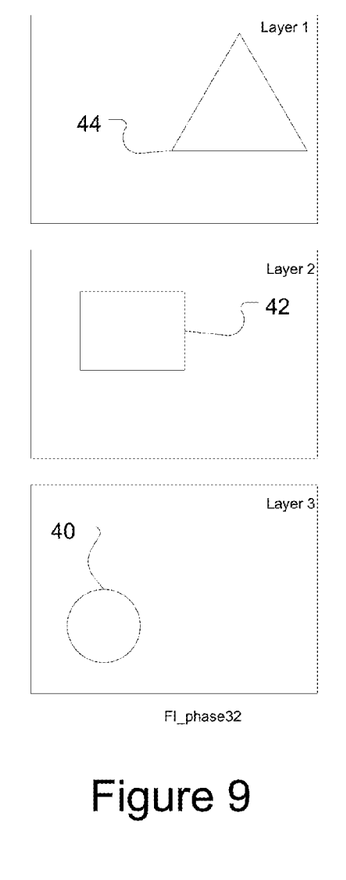
FIG. 9 shows an example of layers in the interpolation phase.

At 34 in FIG. 3, the process will integrate the information and finally generate a single frame of block level motion and pixel layer information. As illustrated in FIG. 4, object of different layers will cover or uncover each other. And the cover/uncover in P1 or CF will lead to cover/uncover in the FI phase. FIG. 9 shows the pixel layer information for the original frames and the generated pixel layer information for each layer from 32. One can find that at some position of the FI phase, the pixel might belong to more than one layer. Similarly, one may calculate the block motion for the same block in FI at more one layer. These process calls these pixels as cover/uncover pixels and blocks as cover/uncover blocks.

At 34, one embodiment of the process fuses for all these layers as follows. First for pixel layer information, if a pixel at FI phase only belongs to one layer, the process assigns that layer as the fused layer information for that pixel. Otherwise, if the pixel belongs to more than one layer, the process selects the front most layer it belongs to as the fused layer information for that pixel.

Figure 10:
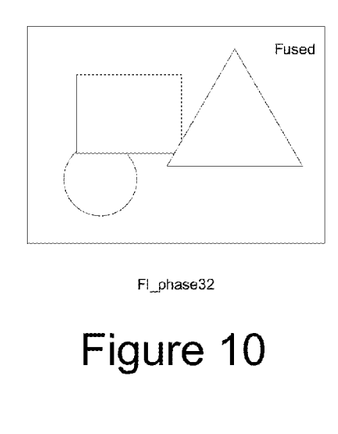
FIG. 10 shows an embodiment of fused layers in the interpolation phase.

The block motion fusion occurs in similar way, if a block at FI phase only belongs to one layer, the process assigns the block motion calculated in that layer as the fused block motion for that block. Otherwise if the block belongs to more than one layer, the process chooses the block motion of front most layer it belongs to as the fused block motion for that block. FIG. 10 illustrates the fused layer information in FI phase.

In some cases, some regions in FI phase cannot find its corresponding region from both P1 and CF. This is due to complex cover/uncover conditions. For these regions, one typically cannot calculate the block motion and pixel layer information for them in the above processes. At 34, the process provides two methods to solve these hole regions.

The first method is an automatic method, for the hole region, it simply uses a zero motion vector as the block motion and uses this zero motion vector to point to P1 and CF to retrieve the pixel layer information. For any pixel in the block, its layer information is calculated as the front most layer information it retrieved from P1 and CF. Alternatively, the process could also use average motion for the bottom most layer in the region.

If the motion vector interpolation is being done as part of the motion vector editing process, a second method is possible. The user can manually edit the block motion for the hole regions in the interpolation phase and also edit the layer information for pixels in the block. If the motion vector interpolation is being done as part of the motion vector editing or before the playback of the video on the display, it may be advantageous to reduce the amount of information being stored and transmitted.

From the above process, one calculates the block motion and pixel layer information for any interpolation phase. At 26 in FIG. 2, the process uses the information to interpolate the phase. For example, one may suppose that the block size of the above module is set to N*N. The setting for the block size is 4*4 in this embodiment. The input for the process 26 is as follows: the 4*4 block level motion for interpolation phase; pixel level layer information for interpolation phase; pixel level layer information for P1; and then pixel level layer information for CF.

At 26, the process will further calculate all the block level information needed for frame interpolation. The process defines the block level information as following:

(1) mv_x: motion at x direction. The process defines mv_x as the 4*4 block motion value at horizontal direction. The process uses 10 bits to represent the value in the range of [−511,511].

(2) mv_y: motion at y direction. The process defines mv_y as the 4*4 block motion value at vertical direction. The process uses 9 bits to represent the value in the range of [−255,255].

(3) Kocc: value to represent the blending weight between P1 and CF. The Kocc value is in the range of [−3,+3]. The −3 value means the interpolation phase only uses the P1 data to do interpolation and the +3 value means it only uses the CF data to do interpolation. The Kocc value between −3 and +3 means the process uses a blend of P1 and CF to do interpolation.

(4) Mode: value to represent the pixel interpolation mode. The mode value is in the range [0,+2] to indicate the block level interpolation mode. In a different mode, the pixels in block will be interpolated by a different strategy.

(5) Mask: value to indicate how to use the neighboring block motion to do interpolation for the current block. The mask value is used with the mode value. With a different mode value, the mask value has a different meaning.

Figure 11:
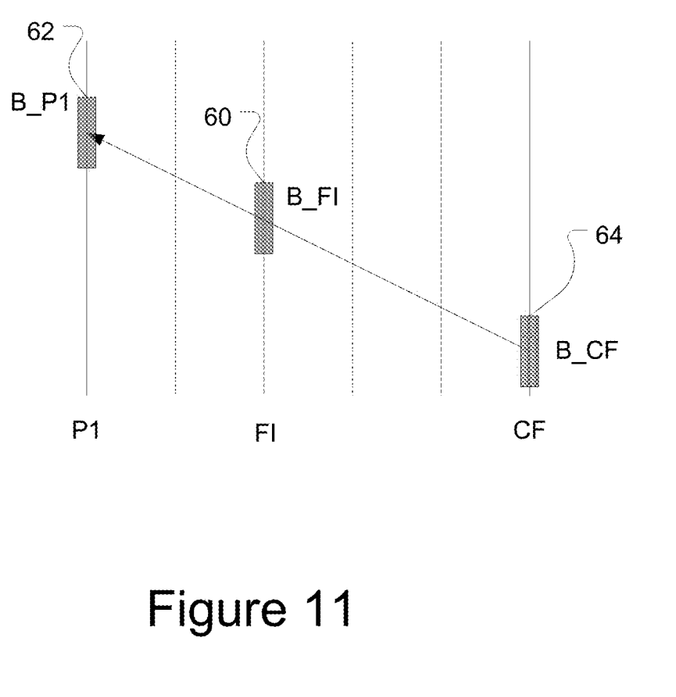
FIG. 11 shows an example of the interpolation block projected to the previous and current frames using the block motion.

First, with the motion for the 4*4 block, the motion has the mv_x and mv_y values. To calculate the Kocc value for each block, the process points to the current block with the block motion relative to P1 and CF as illustrated in FIG. 11. For the current block B_FI, one can retrieve two 4*4 blocks B_P1 and B_CF for P1 and CF separately. Then one can analyze the block layer information for B_P1 and B_CF. One embodiment uses the minimum pixel layer information inside the block as its block layer information. One can define the block level information for B_P1 and B_CF as B_P1_L and B_CF_L. Then with the B_P1_L and B_CF_L, the process can calculate the Kocc value for B_FI by:

If $B\_P1\_L < B\_CF\_L$ Kocc=−3

Else if $B\_P1\_L > B\_CF\_L$ Kocc=+3

If $B\_P1\_L = B\_CF\_L$ Kocc=0

The above formula shows one embodiment of how to calculate the Kocc value according to the layer information in P1 and CF. When the B_P1_L<B_CF_L, meaning the retrieved block B_P1 in P1 will be covered by the block B_CF in CF, the Kocc value will be −3 and make the B_FI in the interpolation phase to use data from P1 phase. When the B_P1_L>B_CF_L which means the retrieved block B_CF in CF is uncovered from block B_P1, the Kocc value will be +3 and make the B_FI in the interpolation phase to use data from CF phase. If the B_P1_L=B_CF_L which means B_P1 and B_CF are in the same layer and does not cover or uncover each other, the Kocc value will be 0 and make the B_FI use the average value of both B_P1 and B_CF. Each 4*4 block has only one Kocc value.

The mode and mask value indicates how to interpolate motion and pixel from a 4*4 block to four 2*2 sub-blocks in one embodiment of the frame interpolation algorithm. The 4*4 block motion will produce blockness in frame interpolation especially at the object boundary. To reduce the blockness, the process uses the Mode and Mask to produce more smooth interpolation results without requiring 4× the amount of storage for motion vectors.

The Mode value identifies the method using motion by which the blocks are broken into sub-blocks. Generally, these methods are to copy motion from an existing block, interpolate motion or a blend of the two. For each mode, there is a sub-mode, or mask, that identifies further information to be used depending upon the mode selected. For example, in Mode 0, copying, the sub-mode includes what motion is to be copied, such as from the diagonal block, the vertical block, the horizontal block, or the current block.

For Mode 1, interpolating, the sub-modes identify how to interpolate the sub-block motion including using the motion of the current block, linearly interpolating the motion horizontally, linearly interpolating the motion vertically, or interpolating using bilinear interpolation. For the Mode 2, blending, the blending is done by weighting the results of interpolating using a current block motion and a motion that is the most different from the current block. The weighting may take many forms, for example, weighting only the current block motion, weighting only the most different motion, weighting to favor the current block motion with some weighting for the most different motion, and weighting to favor the most different motion with some weighting for the current block motion.

Figure 12:
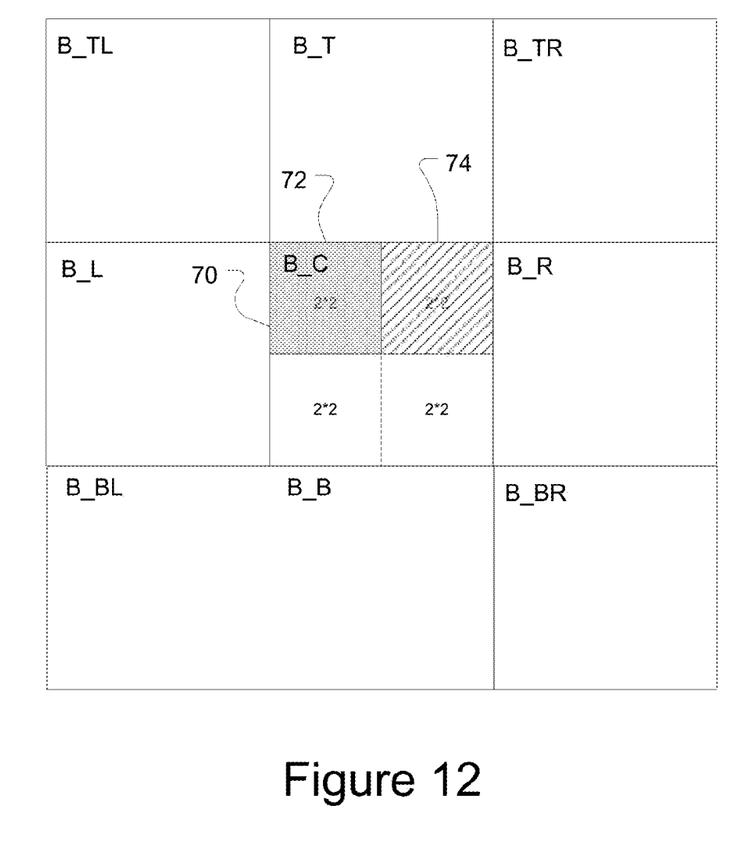
FIG. 12 shows an embodiment of sub-blocks within a block.

For each Mode, the Mask has its own meaning, discussed here. As illustrated in FIG. 12, to interpolate the current block B_C in the interpolation phase, it further divides the 4*4 block B_C in to four sub-blocks. The process takes one of these sub-blocks such as blocks 72 and 74 of block 70 as an example.

Each 4*4 block has one Mode value (3 bits) and each 2*2 sub-block has one Mask value (2 bits). So for a 4*4 block, it has 11 bits Mode and Mask value total. The following part introduces each Mode and Mask value. Mode 0 means the motion of each 2*2 sub-block will be set as one of its neighboring 4*4 block. For example, for the gray sub-block in FIG. 12, its motion will be taken from one of the 4 closest 4×4 blocks: B_TL, B_T, B_L, and B_C. In Mode 0, the 2 bits Mask value for each sub-block indicates which block to choose as follows:

Mask 0: Choose the motion of diagonally adjacent block (B_TL).

Mask 1: Choose the motion of vertically adjacent block (B_T).

Mask 2: Choose the motion of horizontally adjacent block (B_L).

Mask 3: Choose the motion of current block (B_C).

For the remaining three sub-blocks, the meaning of Mask in Mode 0 is similar. The Mode 0 is often used for the blocks inside the object with simple linear motion.

Mode 1 means the motion of each 2*2 sub-block will be interpolated by the motion of its neighboring 4*4 block. For example, for the gray sub-block in FIG. 12, its motion will be interpolated by one or more than one of its neighboring blocks: B_TL, B_T, B_L, and B_C. In Mode 1, the 2 bits Mask value for each sub-block indicates how to do the bilinear motion interpolation:

Mask 0: Use the motion of B_C as the sub-block motion.

Mask 1: Linear interpolate the motion horizontally (B_L and B_C) as the sub-block motion.

Mask 2: Linear interpolate the motion vertically (B_T and B_C) as the sub-block motion.

Mask 3: Bilinear interpolate the motion of B_T, B_L, B_TL and B_C as the sub-block motion.

For the remaining three sub-blocks, the meaning of Mask 3 in Mode 1 is similar. For example, to interpolate the motion of the hatched 2*2 sub-block, one can take B_TR, B_T, B_R, B_C instead of B_TL, B_T, B_L, B_C as its neighboring blocks to do interpolation. The Mode 1 is often used for the blocks with complex non-linear motion such as rotation and zooming Mode 2 means the process will do pixel blending instead of motion bilinear interpolation for the pixels in each sub-block. To do the pixel blending, the process first selects one motion from B_TL, B_T, and B_L that is most different from motion of B_C. The process defines this motion as MV s. Then the process uses the selected motion and the motion of B_C to interpolate the frame for the 2*2 sub-block separately. Finally, the process blends the two results according to the Mask value. In Mode 2, the 2 bits Mask value for each sub-block indicates the weight for pixel blending.

Assume that one defines the interpolation result by motion of B_C as Pix_c and the interpolation result by MV s as Pix_s.

Mask 0: The weight for Pix_c is 3 and the weight for Pix_s is 0.

Mask 1: The weight for Pix_c is 2 and the weight for Pix_s is 1.

Mask 2: The weight for Pix_c is 1 and the weight for Pix_s is 2.

Mask 3: The weight for Pix_c is 0 and the weight for Pix_s is 3.

For the rest three sub-blocks, the meaning of Mask in Mode 2 is similar. The Mode 2 is often used for the blocks at the object boundary. The following table summarizes the conditions.

| | Mode 0 | Mode 1 | Mode 2 |
| --- | --- | --- | --- |
| | To select the one of neighboring block motion as sub-block motion (copy) | To select the method to interpolate the sub-block motion from neighboring blocks (interpolate) | To indicate the pixel blending weight retrieved by the current motion and its most different motion in its neighbor. (blending) |
| Mask 0: | Choose the motion of the diagonal block | Use the motion of current block as the sub-block motion | The weight for Pix_c is 3 and the weight for Pix_s is 0 (interpolation) |
| Mask 1: | Choose the motion of the vertical block | Linear interpolate the motion horizontally as the sub-block motion | The weight for Pix_c is 2 and the weight for Pix_s is 1 (interpolation weighted) |
| Mask 2: | Choose the motion of the horizontal block | Linear interpolate the motion vertically as the sub-block motion | The weight for Pix_c is 1 and the weight for Pix_s is 2 (different weighted) |
| Mask 3: | Choose the motion of the current block | Bilinear interpolate the motion as the sub-block motion | The weight for Pix_c is 0 and the weight for Pix_s is 3 (different) |

The Mode value and Mask value can be either manually edited or automatically calculated by an adaptive algorithm. In one embodiment, the process can first classify the 4*4 blocks into two types, the first type includes the object boundary and the second type is the blocks inside the object. Then for the first type block, one can set the Mode 2 for them for the pixel smoothness at the boundary. For the first type sub-blocks, the Mask value is then calculated according to how many foreground and background pixels are included in the each 2*2 sub-block separately. More foreground pixels means the weight for the foreground motion should be larger.

Then for the second type blocks, one can usually set the Mode 0 for them if the object motion is linear motion. Otherwise if the object motion is non-linear, the process sets the Mode 1 for them. And for the 2*2 sub-blocks in the second type blocks, the Mask value is selected to 3 as default to select the current 4*4 block motion in Mode 0 and do bilinear interpolation with all 4 neighboring blocks in Mode 1.

After all the above information is obtained, for each 4*4 block, the process has 32 bits total to describe how to interpolate the pixel inside it. The FI module receives the block motion fields and interpolates the frame according to the method described above.

In summary, the process first collects the input for FI module as a 4*4 block-level motion for interpolation phase, pixel-layer information for interpolation phase, pixel-layer information for P1 and CF. Use the motion for each 4*4 block to project the block to P1 and CF. The process calculates the Kocc value for each 4*4 block based on pixel layer information of P1 and CF. The process then sets the Mode and Mask to calculate the Mode and Mask automatically for all blocks. For each block, with the calculated Mode and Mask, one chooses the corresponding interpolation algorithm, and collects the required neighboring block motion information. Finally, the process interpolates the pixel according to the selected interpolation algorithm with all the collected information.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method to produce a frame of video data, comprising:
    receiving original frame true motion information, original frame object boundary information, and original frame layer information for at least two original frames of video data; and
    generating block boundary information and block level motion information for layer objects in an interpolated frame from the original frame block-level true motion information, original frame pixel-level object boundary information, and original frame pixel-level layer information for the original frame by projecting boundary pixels of the layer objects from the original frames into the interpolated frame;
    retrieving pixel level layer information of the interpolated frame from the original frames by projecting the generated block level motion information of the layer objects of the interpolated frame into the original frames;
    integrating the generated block level motion and pixel level layer information of the layer objects to generate a single interpolated frame of video data.

2. The method of claim 1, further comprising filling hole regions at the interpolation phase.

3. The method of claim 1, wherein generating interpolation phase block level motion and interpolation phase pixel level layer information comprises:
    projecting boundary pixels to the interpolated phase using original motion vectors;
    determining if a block has at least one boundary pixel; and
    if the block has at least one boundary pixel, identifying the block as a boundary block.

4. The method of claim 2, wherein filling hole regions comprises identifying regions at the interpolation phase where there is no corresponding region from the original frames of video data.

5. The method of claim 4, wherein filling hole regions at the interpolation phase comprises using a zero motion vector to point to the original frames of video data and retrieving pixel layer information.

6. The method of claim 4, where in filling hole regions at the interpolation phase comprises receiving block motion inputs from a user.

7. The method of claim 1, wherein using the block motion and pixel-level layer information to generate an interpolated frame of video data comprises interpolating motion and pixel information from a larger block to a sub-block.

8. The method of claim 7, wherein interpolating motion and pixel information from a larger block to a sub-block comprises:
    defining a mode that identifies motion to applied to the sub-block; and
    defining a mask that designates application of the motion to the sub-block.

9. The method of claim 8, wherein defining the mode comprises one of copying, interpolating and blending the motion.

10. The method of claim 9, wherein defining the mode comprises copying and defining a mask comprises one of choosing a diagonal block, a vertical block, a horizontal block and a current block.

11. The method of claim 9, wherein defining the mode comprises interpolating and defining a mask comprises using motion of a current block, linearly interpolating motion horizontally, linearly interpolating motion vertically, and bilinearly interpolating motion.

12. The method of claim 9, wherein defining the mode comprises blending the motion and defining the mask comprises one of interpolation, interpolation weighted, different weighted and different.

* * * * *